June 27, 1967  S. O. STAGEBERG  3,327,477
VARIABLE TORQUE CONVERTER

Filed Oct. 22, 1965  2 Sheets-Sheet 1

INVENTOR
STERLING O. STAGEBERG

BY *Roy E. Raney*
ATTORNEY

June 27, 1967     S. O. STAGEBERG     3,327,477
VARIABLE TORQUE CONVERTER
Filed Oct. 22, 1965     2 Sheets-Sheet 2
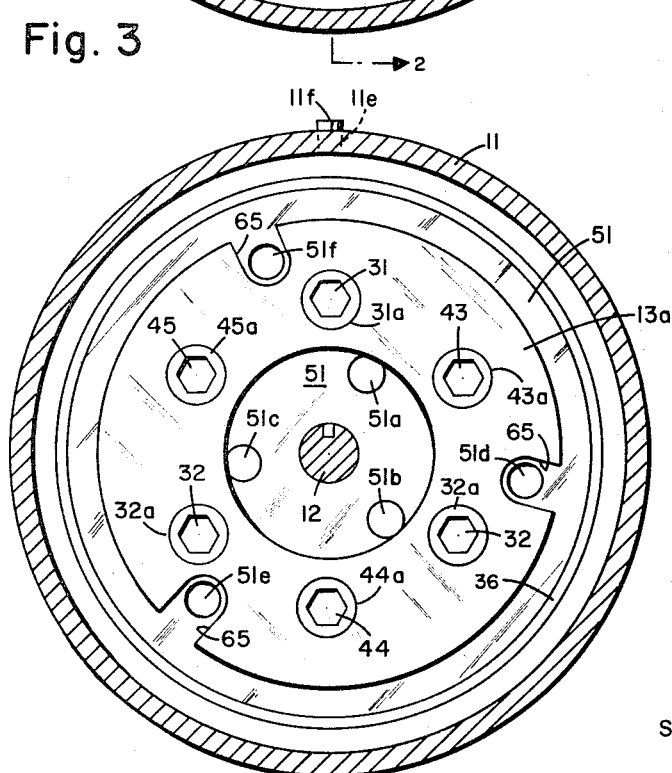
Fig. 3
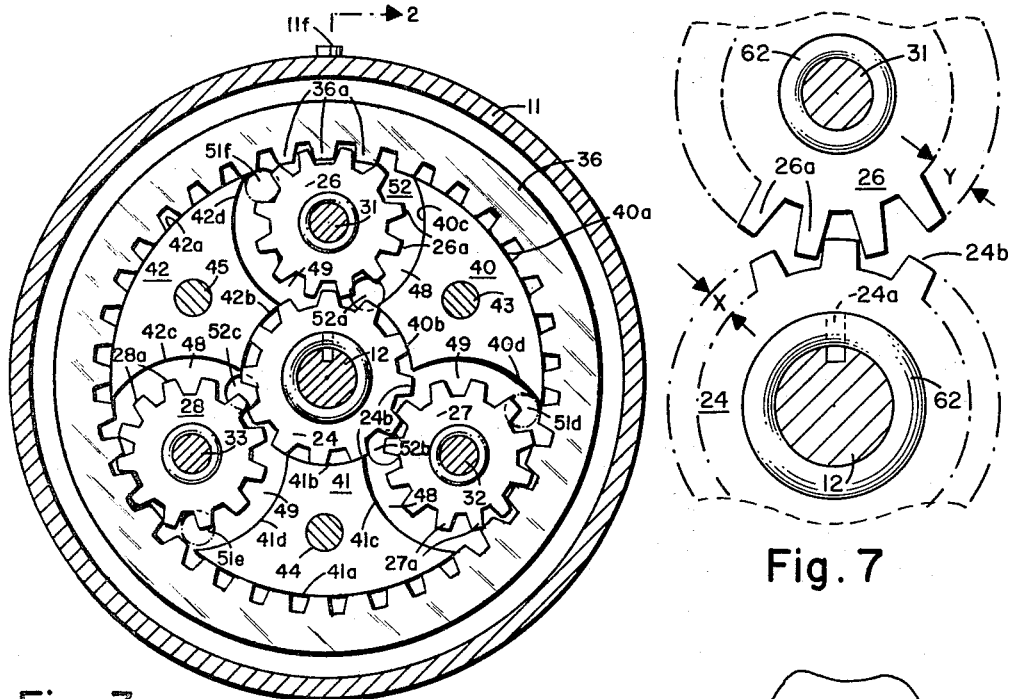
Fig. 4
Fig. 7
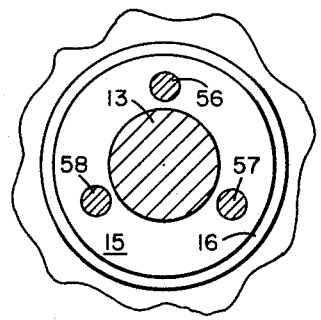
Fig. 5
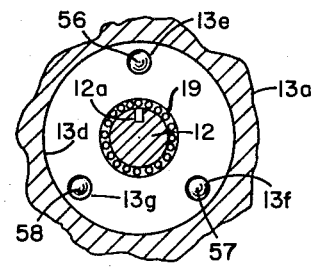
Fig. 6
INVENTOR
STERLING O. STAGEBERG
BY
ATTORNEY United States Patent Office 3,327,477
Patented June 27, 1967

3,327,477
VARIABLE TORQUE CONVERTER
Sterling O. Stageberg, 18210 Sunset Blvd.,
Redington Shores, Fla.
Filed Oct. 22, 1965, Ser. No. 500,556
29 Claims. (Cl. 60—53)

The present invention relates to an infinitely variable hydraulically controlled torque converter of the epicyclic gear type.

A well known form of gear transmission is the type having torque input and output elements drivingly connected with one another through a variable speed reactance gear, the speed of which gear is varied by placing various loads thereon to cause a resultant drive of the output shaft at a speed normally inversely proportional to the speed of the reactance gear. A serious problem with this type of transmission is the loss of torque or power occasioned by the variable loading of the reactance gear. This loading has been effected, for example, by causing the reactance gear to drive a hydraulic fluid pump and controlling the loading on the gear by restricting more or less the discharge from the pump by valving means. This practice results in the generation of considerable heat which is reflected in the loss of torque so that the widespread use of such transmission has not been practical.

A principal object of the present invention is the provision of a transmission of the type mentioned in which the reactance gear is loaded to reduce its speed by causing a major portion of its torque to be transmitted to the drive elements of the transmission whereby a highly efficient infinitely variable speed torque converter is provided.

Another object of the invention is the provision of a transmission of the type mentioned in which the reactance gear drives a hydraulic fluid pump, the output of which is directed to the intake of a hydraulic fluid driven motor connected with a torque transmitting element of the transmission, the output volume of the pump being in excess of the intake capacity of the fluid motor for a given speed of the transmission, and the back pressure on the pump, and therefore the loading on the reactance gear in excess of the loading effected by driving the fluid motor, being accomplished by diverting from the motor intake more or less of the excess of fluid from the pump output. By providing a relatively small excess of pumped fluid over that utilized by the fluid motor, the variations in the total loading imposed on the reactance gear can be effected by diverting more or less of the relatively small volume of fluid by valving whereby the heat generated in the diversion of the fluid and consequently the torque loss through the transmission, is comparatively minor.

A further object of the invention is the provision of a torque converter having a plurality of meshing gears forming fluid displacing devices having variable flow pressures by which variable drive of the output of the transmission is achieved, the fluid displacing devices including side plates which sealingly engage the ends of the gears to retain fluid between the teeth thereof, the side plates being urged to the ends of the gears by a force proportional to the fluid pressures developed by the fluid displacing devices whereby friction of the engaging parts is reduced to a minimum during low pressure conditions and is increased to provide closer tolerance sealing in response to higher fluid pressures to be contained.

Other objects and advantages of the invention will be apparent from the following description of a preferred form thereof, reference being made to the accompanying drawings wherein:

FIG. 3 is a sectional view taken substantially along line 3—3 of FIG. 2;

FIG. 4 is a sectional view taken substantially along line 4—4 of FIG. 2;

FIG. 5 is a sectional view taken substantially along line 5—5 of FIG. 2;

FIG. 6 is a sectional view taken substantially along line 6—6 of FIG. 2; and

FIG. 7 is a fragmentary view of gears shown in FIG. 3, but drawn on a larger scale.

Figure 1:
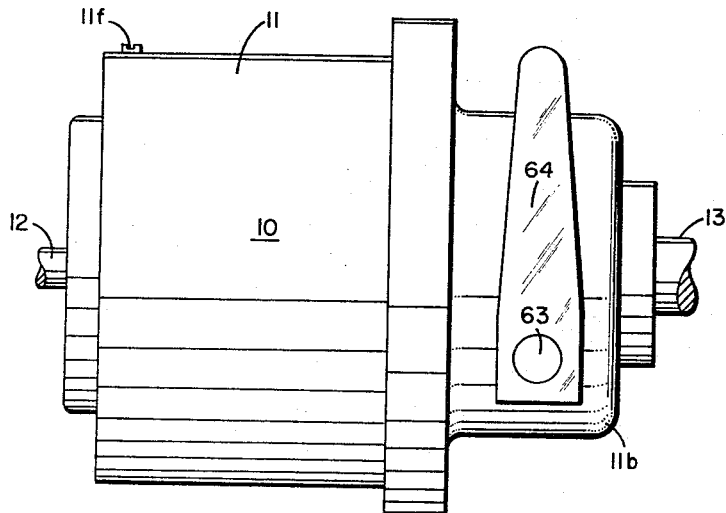
FIG. 1 is a perspective view of a variable speed transmission embodying the invention.

Referring to the drawings, a variable speed torque converter embodying the invention is shown at 10, and it includes a housing 11, an input or drive shaft 12, and an output or driven shaft 13, the speed of which can be varied relative to the input shaft from substantially a one-to-one ratio to one-to-infinity. The transmission can be used to couple any convenient source of torque to a suitable load, neither of which are shown.

The housing 11, which is adapted to contain a body of suitable hydraulic system oil, comprises a cylindrical shell 11a having a bell shaped end cap 11b bolted thereto by bolts 14, only two of which appear in the drawings. The driven shaft 13 has a collar 15 attached thereto which is in turn journaled in a ball bearing 16 supported in the end cap 11b. The inner end of the driven shaft 13 has a radially extending circular flange 13a formed thereon and which comprises an end plate of a cage structure 17 attached thereto, the cage structure including a disc shaped end plate 17a having a hub portion 17b journaled in a roller bearing 18 supported in an opening through the housing end wall 11d.

The inner end of the drive shaft 12 is journaled in a recess 13b in the output shaft 13 by a needle bearing 19, and is freely rotatable in an opening through cage plate 17a. The ends of the housing 11 are sealed about the openings therein through which the shafts 12, 13 extend by an end plate 20. End plate 20 carries a flexible lip seal 21 surrounding the shaft 12 and secured to the housing by bolts 22, and a lip seal 23, which surrounds shaft 13, is supported in an end recess in the end cap 11b. The seals 21 and 23 are of well known form and further description is deemed unnecessary.

Figure 2:
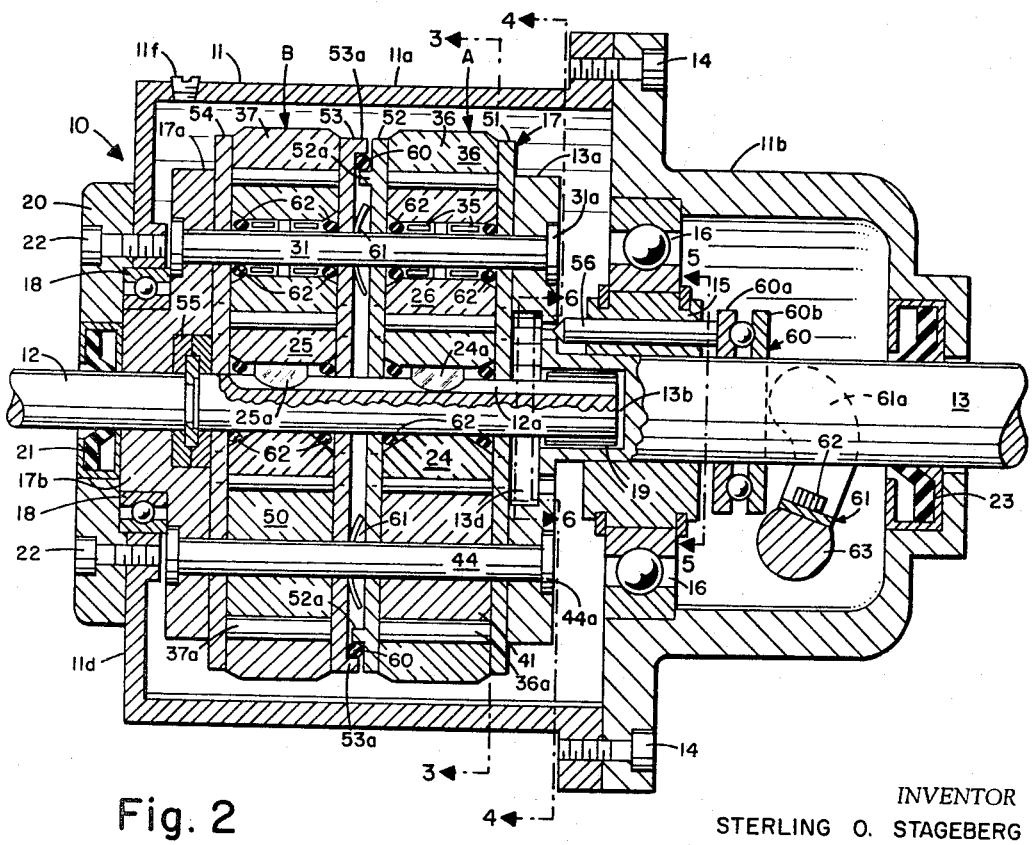
FIG. 2 is a longitudinal sectional view of the transmission drawn on a larger scale, the view being taken substantially along line 2—2 of FIG. 3.

The drive shaft 12 has two sun gears 24, 25 keyed thereto by keys 24a, 25a lodged in a slot 12a formed along the shaft and each sun gear meshes with three planetary gears which are journaled in the cage structure 17 and which are adapted to revolve with the cage about the sun gears. The three planetary gears mesh with the respective sun gears and are surrounded by and mesh with a ring gear respectively. The sun gears and the gears driven thereby are referred to as drive units A and B, respectively, and inasmuch as the structures of the units are substantially identical, only the structure of unit A is described in detail. Referring to FIGS. 2 and 3 in particular, the planetary gears 26, 27, 28 mesh with sun gear 24, and are journaled on headed shafts 31, 32, 33 respectively, which are secured in aligned openings through the cage plates 13a and 17a by nuts 31a, 32a, 33a threaded onto the ends of the shafts and the gears rotate on suitable bearings, such as needle bearings, one of which appears at 35.

Ring ring 36 surrounds the sun gear 24 and the planetary gears 26, 27, 28 and the teeth 36a thereof mesh with the teeth 26a, 27a, 28a of the respective planetary gears. The ring gear for drive unit B is indicated at 37 and corresponds to ring gear 36. It will be noted that the ring gears 36, 37 are not attached to any other element of the transmission and they may revolve freely, except as otherwise described hereinafter. The planetary gear system thus far described is well known and it is apparent that when the shaft 12 is rotated clockwise, as viewed in FIG. 3, the planetary gears will be driven counterclockwise if a load prevents the cage 17 and the output shaft 13 from rotating. If the ring gears 36, 37 are free to rotate, they will rotate counterclockwise. If the ring gears are loaded more or less, thereby reducing their speed relative to the driven shaft then the reactance of their loading will cause the planetary gears to rotate the cage 17 and driven shaft 13 clockwise at a speed proportional to the reduction in speed of the ring gears. When the ring gears are loaded sufficiently with respect to the load on the output shaft 13, the planetary gears no longer rotate about their shafts 31, 32, 33 and the cage 17 is then driven with the sun gears 24, 25. In the form of the invention shown, the ring gear 36, 37 may be selectively loaded to provide an infinite variation in speed of the output shaft.

It should be understood that the teeth of the planetary gears 26, 27, 28 and the teeth of the ring gear 36 meshing therewith form fluid pumping means and that oil between the teeth 36a of the ring gear is displaced therefrom by the entrance therebetween of the teeth 26a, 27a, 28a of the respective planetary gears, as is explained more fully hereinafter. Furthermore, the depth of the gear teeth 24b, and 25b of the sun gears 24, 25 are only 80% of the depth of the teeth of the planetary and ring gears so that the volume of oil carried and displaced from the teeth of the ring gears will be 20% in excess of the volume capable of being received between the teeth of the sun gears. This difference in height of teeth is shown in FIG. 7 wherein X represents the depth of the teeth 24b and Y the depth of teeth 26a.

Three generally wedge shaped wall members 40, 41, 42 are located between the planetary gears 26, 27; 27, 28 respectively, and are secured in place by headed tie rods 43, 44, 45, the straight ends of which are secured in openings through the cage end plate 13a, by nuts 43a, 44a, 45a respectively.

It will be understood that drive unit B includes wall members which are like members 40, 41, 42 and are likewise positioned between the planetary gears meshing with the sun gear 25, but only member 50, which corresponds to member 41, appears in the drawings. The wall members of drive until B are secured in place by the same respective tie rods which secure the members 40, 41, 42.

The wall members 40, 41, 42 have arcuate outer surfaces 40a, 41a, 42a which closely fit the ends of the gear teeth 36a of the ring gear 36 so that oil entering between these teeth is retained therein by these wall surfaces. Likewise, the arcuate wall sections 40b, 41b, 42b closely fit the teeth 24b of the sun gear 24 to trap oil between the teeth thereof as is explained more fully hereinafter. The walls 40c, 40d, 41c, 41d, 42c, 42d interconnecting with the two walls respectively of each wall member are widely spaced from the teeth of the adjacent planetary gears so as to provide relatively unrestricted oil flow paths 48 from the ring gear 36 to the sun gear 24 and relatively free oil flow paths 49 from the sun gear to the ring gear.

It will be understood that the wall members of unit B have the same relative wall forms as described with reference to the wall members 40, 41, 42 of unit A.

The thickness of all of the gears is the same and the lateral ends of the teeth of the ring gears 36, 37 and the teeth of the sun gear 24 of the respective units A, B are closed by oil retaining plates 51, 52 and 53, 54, which plates closely engage the lateral ends of the respective gears mentioned, as well as the ends of the wall members such as 40, 41, 42. Each retaining plate 51–54 has a central opening through which the drive shaft 12 freely extends, and each plate has openings through which the shafts 31, 32, 33 and tie rods 43, 44, 45 extend. Plate 54 abuts cage plate 17a and a suitable oil seal 55 is disposed about shaft 12 and the walls of the cage plate 17a adjacent the opening through which the shaft extends to prevent escape of oil outwardly along the shaft. Plate 53 abuts the inner lateral ends of the gears and wall members forming drive unit B and plate 53 as well as the gears and wall members are capable of shifting slightly axially relative to the gears so that pressure applied to move the plate 53 towards plate 54 results in closer engagements of the plates and the parts therebetween.

The retainer plate 52 which is adjacent the retainer plate 53, and engages the inner ends of sun gear 24, planetary gears 26, 27, 28 and ring gear 36 has an annular, axially projecting flange or bead 52a thereabout which is concentric with a similar bead 53a formed about the edge of retainer plate 53, and a resilient O-ring 60 is snugly interposed between the beads to seal the opening between the peripheries of the retainer plates and yet permit slight relative axial movements of the plates. Dish shaped springs 61, only two of which appear in the drawings, are positioned about the shafts 31, 32, 33 and tie rods 43, 44, 45 to maintain a separating pressure between the plates 52, 53. Retainer plate 51 engages the outer ends of the sun gear 24, planetary gears 26, 27, 28 and ring gear 36. O-rings 62 are disposed about the shafts 12, 31, 32, 33 and the respective gears supported thereby to prevent oil leakage outwardly from the sun and planetary gears along their supporting shafts and through the openings in the retainer plates 51, 52, 53, 54.

It will be seen that the sun, planetary and ring gears of the drive units A, B are enclosed so as to form oil displacing or pumping structures at the areas in which gear teeth of the planetary gears enter between the teeth of the ring gears which are at the outer portions of the passages, and oil is discharged into these passages. Also, the teeth of the sun gears of the respective drive units A, B, cooperating with the wall sections 40b, 41b, 42b form fluid pressure absorbing or motoring means which is responsive to the oil pressure in the passages 48 to apply torque to the input shaft 12 because the teeth of the sun gear at the ends of the arcuate wall sections 40b, 41b, 42b at the passages 48 are subjected to a higher pressure than the teeth at the opposite ends of these walls and at passages 49. Because the volume between the teeth 24a, 25a of the sun gears 24, 25 is only 80% of the volume between the teeth of the ring gears, a greater volume of oil will enter or be discharged by the pumping action of the planetary and ring gears into the passages 48 than can be carried therefrom between the teeth of the sun gears, for any given speed of the gears when ring gears are moving relative to the cage 17.

This excess volume of oil is by-passed around the sun gears and their walls 40b, 41b, 42b by three oil passage openings 51a, 51b, 51c, which only appear in plates 51, 52 in the drawings, and which are located to open into the inner ends of the respective passages 48. Each of the retainer plates 52, 53, 54 have like openings aligned with respective openings 51a, 51b, 51c so that the excess oil in the passages 48 of both units flows without appreciable restriction through these openings towards the right hand end of the cage 17, as viewed in FIG. 2, and enters a cylindrical recess or chamber 13d formed in the central portion of the flange 13a.

The flow of oil from the chamber 13d into the housing 11 proper is effected through three ports 13e, 13f, 13g drilled in the flange 13a and which are adapted to be closed or throttled by three valve pins 56, 57, 58 slidably carried in openings through the collar 15. The inner ends of the pins 56, 57, 58 are tapered to provide fine throttling of the valve ports in which the respective pins enter, and the outer ends engage an annular race 60a of a thrust bearing 60 which is slidably supported on output shaft 13 and the outer race 60b of which is engaged by the two fingers of a Scotch yoke 61, only one of which fingers 61a appears in the drawings. During operation of the transmission, the oil pressure in chamber 13d urges the pins against the bearing race 60a. The yoke portion of the Scotch yoke 61 is secured by bolts 62 (only one appearing in the drawings) to the flat of a rocker shaft 63 journaled in suitable bearings in the walls of the end cap 11b. One end of shaft 63 extends through a sealed opening and projects from the side wall of cap 11b and has an operating arm 64 attached thereto by which the shaft can be rotated to position the valve pins 56, 57, 58 to regulate the flow of oil from the recess 13d.

Oil is returned to the passages 49 of the drive unit A from the housing proper through three openings 51d, 51e, 51f formed through the retainer plate 51, which openings communicate with the respective passages 49 at the outer ends thereof and adjacent the entrance of the teeth of the ring gear 36 into the oil retaining channels formed by the arcuate wall sections 40a, 41a, 42a and the respective retainer plates 51, 52. Although not shown, like openings are formed in retainer plate 54 for admitting oil into corresponding passages 49 of unit B. The end plate 13a of cage 17 has notches 65 therein in alignment with the openings 51d, 51e, 51f in plate 51 to provide access of oil to these openings. Openings are provided in plate 54 and notches are provided in end plate 17d similar to openings 51d, 51e, 51f and 65 respectively, to permit flow of oil into these oil return passages in drive unit B.

As mentioned previously, the housing 11 contains a body of suitable hydraulic fluid, such as oil, which may be introduced into the housing through an opening 11e closed by a plug 11f.

For sake of clarity, the operation of the torque converter is described principally with reference to the elements of unit A only and is as follows:

Shaft 12 is driven clockwise, as viewed in FIGS. 3, 4 by any suitable prime mover, and assuming shaft 13 to be connected to a load and the ports 13e, 13f, 13g to be fully open, the rotation of the sun gear 24 causes rotation of the planetary gears 26, 27 28 counterclockwise about their respective axes or shafts 33, 31, 32 and the ring gear 36 will be driven counterclockwise thereby. The entrance of the teeth of the planetary gears 26, 27, 28 between the teeth of the ring gear 36 forces the oil from between the latter teeth and into the passages 48. The entrance of the gear teeth 24a of the sun gear 24 into the oil retaining channels comprised of the walls 40b, 41b, 42b, and retainer plates 51, 52 carries oil away from the passages 48 to the passages 49; however, because the depth of the sun gear teeth is only 80% of the depth of the teeth of the planetary and ring gears, 20% of the oil pumped into the outer portions of the passages 48, less leakage, circulates from the openings 51a, 51b, 51c into recess 13d and the oil passes relatively freely therethrough and into the housing proper and returns to the drive units A, B through the openings 51d, 51e, 51f and those in plate 54 corresponding thereto. Inasmuch as the rotation of the ring gear 36 is not materially opposed, this gear rotates while the cage 17 and driven shaft 13 remain stationary.

By throttling the flow of oil from the recess 13d by shifting the valve pins 56, 57, 58 partially into the respective valve ports 13e, 13f, 13g, by actuation of arm 64, the pressure of the oil discharged into passages 48 from the ring gear teeth increases causing resistance to rotation of the ring gear because the oil pressure tends to drive the ring gear clockwise and also restricts the displacement of oil from between the teeth of the ring gear. This fluid pressure in the passages 48 acts on teeth of the planetary gears 26a, 27a, 28a equally on opposite sides of their respective axes or shafts 30, 31, 32 and its effect on these gears is therefore counterbalanced and nullified.

The area of the teeth 24a of the sun gear 24, however, is exposed to the oil pressure in pasages 48, and because the oil pressure in passages 49 is relatively lower, being at the intake of the pump formed by the ring gear, the differential in oil pressure between passages 48 and 49 causes a driving or motoring effect to be produced on the sun gear in a direction to restore power thereto in the form of torque. It will be seen that only 20% or less of the oil acting to restrain rotation of the ring gear 36 will pass through the valve ports 31e, 31f, 31g while the remainder of the oil is utilized in a relatively free flowing hydraulic pump and motor system to restore torque to the driving element of the converter; therefore, a relatively small amount of energy is transformed into heat and lost.

As the back pressure in the pump discharge passages 48 increases by throttling of the ports 13e, 13f, 13g, the speed of rotation of the gear ring 36 relative to the cage 17 decreases and the cage tends to be rotated and revolved by the reactance of the planetary gears 26, 27, 28 with the ring gear 36. The relative speed of rotation of the ring gear 36 to the cage 17 decreases as the amount of oil permitted to flow through ports 13e, 13f, 13g decreases, and when the ports are completely closed, the ring gear 36 will substantially "lock up" with the cage 17 and the cage then rotates with the sun gear 24. In practice slight leakage of oil from the structures forming passages 48 of the drive units A, B occurs which introduces a slight slippage of the ring gear relative to the cage 17 and the speed ratio through the transmission will be slightly less than one-to-one.

The operation described with reference to unit A is duplicated by the unit B.

It will be seen that as the oil pressure increases within the drive units A, B and between the retainer plates 52, 53, these plates will be forced apart, thereby causing the plate 52 to press towards plate 51 and plate 53 to press towards plate 54 so that the gears and wall members therebetween are tightly engaged which increases the oil sealing effectiveness of the retainer plates and the members engaged thereby proportional to the increase in oil pressure. On the other hand, as the oil pressure decreases and greater relative movement occurs between the retainer plates and the parts sealingly engaged thereby, such as the sides of the ring gears 36, 37, the pressures between the plates and these parts is reduced, thereby correspondingly reducing the friction between the sliding surfaces thereof.

It will be seen that the invention provides a torque converter in which hydraulic fluid is utilized to variably restrain a reactance component of the transmission in a manner which retains a major portion of the torque energy as torque and a relatively minute portion of the working fluid is valved and subjected to heat producing action whereby a highly efficient, infinitely variable torque converter or transmission is provided.

It will be noted that in the form of the invention shown and described the capacity of the motor comprising the sun gear teeth is 80% of that of the fluid pump comprising the ring gear teeth, any other suitable proportion could be selected, the criteria being that the volumetric output of the pump should be slightly in excess of the oil absorbed by the motor and the inherent leakage from passages 48. The smaller the excess volume the less heat loss will be encountered; some excess volume, however, is necessary to effect a controllable back pressure of the pumping means and to transmit torque from the ring gears to the sun gears.

Although but one form of the invention has been shown and described, it will be understood that other forms, modifications and adaptations thereof could be made, all falling within the scope of the claims which follow.

I claim:

1. In a torque converter having a drive member, a driven member and a variable speed member actuated so that the speed of rotation of said driven member relative to the speed of rotation of said drive member is proportional to the speed of said variable speed member; means to control the speed of said variable speed member relative to said driven member comprising, hydraulic fluid pump means having a fluid inlet and a fluid discharge and operated by cooperation of said driven member and said variable speed member, a hydraulic fluid motor having a fluid inlet and being drivingly connected with said drive member, means forming a relatively unrestricted passageway from the discharge of said pump means to the intake of said motor means for conducting fluid from the outlet of said pump to the inlet of said motor, and means for controlling the fluid pressure in said passageway.

2. In a torque converter having a drive member, a driven member and a variable speed member actuated so that the speed of rotation of said driven member relative to the speed of rotation of said drive member is proportional to the speed of said variable speed member; means to control the speed of said variable speed member relative to said driven member comprising, hydraulic fluid pump means having a fluid inlet and a fluid discharge and operated by cooperation of said driven member and said variable speed member, a hydraulic fluid motor having a fluid inlet and being drivingly connected with said drive member, means forming a passageway from the discharge of said pump means to the intake of said motor means for conducting fluid from the outlet of said pump to the inlet of said motor, and means for controlling the fluid pressure in said passageway.

3. In a torque converter having a drive member, a driven member and a variable speed member actuated so that the speed of rotation of said driven member relative to the speed of rotation of said drive member is proportional to the speed of said variable speed member; means to control the speed of said variable speed member relative to said driven member comprising, hydraulic fluid pump means having a fluid inlet and a fluid discharge and operated by cooperation of said driven member and said variable speed member, a hydraulic fluid motor having a fluid inlet and being drivingly connected with said drive member, means forming a passageway from the discharge of said pump means to the intake of said motor means for conducting fluid from the outlet of said pump to the inlet of said motor, and means for controlling the fluid pressure in said passageway comprising a fluid passage from said passageway to said fluid inlet of said pump and valve means in said passage.

4. In a torque converter having a drive member, a driven member and a variable speed member actuated so that the speed of rotation of said driven member relative to the speed of rotation of said drive member is proportional to the speed of said variable speed member; means to control the speed of said variable speed member relative to said driven member comprising, hydraulic fluid pump means having a fluid inlet and a fluid discharge and operated by cooperation of said driven member and said variable speed member, a hydraulic fluid motor having a fluid inlet and a fluid exhaust and drivingly connected with said driven member, means forming a relatively unrestricted passageway from the discharge of said pump means to the intake of said motor for conducting fluid from the outlet of said pump to the inlet of said motor, means forming a relatively unrestricted fluid passageway from the exhaust of said motor to the inlet of said pump means, and valve means for controlling the pressure of fluid in the first mentioned passageway.

5. In a torque converter having a drive member, a driven member and a variable speed member actuated so that the speed of rotation of said driven member relative to the speed of rotation of said drive member is proportional to the speed of said variable speed member; means to control the speed of said variable speed member relative to said driven member comprising, hydraulic fluid pump means having a fluid inlet and a fluid discharge and operated by cooperation of said driven member and said variable speed member, a hydraulic fluid motor having a fluid inlet and a fluid exhaust and drivingly connected with said driven member, means forming a passageway from the discharge of said pump means to the intake of said motor for conducting fluid from the outlet of said pump to the inlet of said motor, means forming a fluid passageway from the exhaust of said motor to the inlet of said pump means, and means for controlling the pressure of fluid in the first mentioned passageway comprising a fluid passage interconnecting said passageways and valve means in said passage.

6. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid discharge and operated by cooperation of said driven member and said variable speed member, a hydraulic fluid motor having a fluid inlet and drivingly connected with said drive member, means forming a relatively unrestricted passageway from the discharge of said pump means to the intake of said motor for conducting fluid from the outlet of said pump means to the inlet of said motor, the volumetric output of said pump being greater than the volumetric capacity of said motor for a given speed of said transmission, and means for controlling the pressure of fluid in said passageway.

7. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid discharge and operated by cooperation of said driven member and said variable speed member, a hydraulic fluid motor having a fluid inlet and drivingly connected with said drive member, means forming a passageway from the discharge of said pump means to the intake of said motor for conducting fluid from the outlet of said pump means to the inlet of said motor, the volumetric output of said pump being greater than the volumetric capacity of said motor for a given speed of said transmission, and means for controlling the pressure of fluid in said passageway.

8. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid discharge, a hydraulic fluid motor having a fluid inlet and drivingly connected with a rotatable element of said converter, means forming a passageway from the discharge of said pump means to the intake of said motor for conducting fluid from the outlet of said pump means to the inlet of said motor for applying driving pressure to said motor, the volumetric output of said pump being greater than the volumetric capacity of said motor for a given speed of said transmission, and means for controlling the pressure of fluid in said passageway.

9. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid discharge, a hydraulic fluid motor having a fluid inlet and drivingly connected with a rotatable element of said converter, means forming a passageway from the discharge of said pump means to the intake of said motor for conducting fluid from the outlet of said pump means to the inlet of said motor for applying driving pressure to said motor, the volumetric output of said pump being greater than the volumetric capacity of said motor for a given speed of said transmission, and means for controlling the pressure of fluid in said passageway comprising means to divert the exhaust fluid from said passageway which is in excess of the fluid capacity of said motor.

10. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid inlet and a fluid discharge and operated by cooperation of said driven member and said variable speed member, a hydraulic fluid motor having a fluid inlet and a fluid exhaust and being drivingly connected with said drive member, means forming a relatively unrestricted passageway from the discharge of said pump means to the intake of said motor for conducting fluid from the outlet of said pump means to the inlet of said motor, means forming a relatively unrestricted passageway from the exhaust of said motor to the intake of said pump means, the volumetric output of said pump means being greater than the volumetric capacity of said motor, and means for controlling the pressure of fluid in said passageways.

11. In a torque converter comprising a drive member, a driven member and a variable speed member actuated so that the speed of rotation of said driven member relative to the speed of rotation of said drive member is proportional to the speed of said variable speed member; means to control the speed of said variable speed member relative to the speed of said driven member comprising, hydraulic fluid pump means having a fluid inlet and a fluid discharge and operated by cooperation of said driven member and said variable speed member, a hydraulic fluid motor having a fluid inlet and a fluid exhaust and being drivingly connected with said drive member, means forming a relatively unrestricted passageway from the discharge of said pump means to the intake of said motor for conducting fluid from the outlet of said pump means to the inlet of said motor, means forming a relatively unrestricted passageway from the exhaust of said motor to the intake of said pump means, the volumetric output of said pump means being greater than the volumetric capacity of said motor, and means for controlling the pressure of fluid in said passageways comprising means forming a fluid passage interconnecting said passageways and valve means in said passage.

12. A torque converter comprising an input shaft, a sun gear on said shaft, a driven shaft, means supporting a planetary gear on said driven shaft for rotation about said sun gear and in mesh therewith, a ring gear surrounding said sun and planetary gears and meshing with said planetary gear, wall means on said supporting means closely engaging the outer end edges of the teeth of a sector of said ring gear and forming a retaining wall of a pump comprised of said planetary and ring gears, wall means on said supporting means closely engaging the outer ends of the teeth of a sector of said sun gear and cooperating with the teeth of said sun gear to form a fluid motor, means forming relatively unrestricted fluid passageways between ends of said wall means, one of said passageways comprising the outlet and intake of said fluid pump and said fluid motor respectively and the other passageway comprising the exhaust of said motor and the intake of said pump, the outlet and intake capacities of said pump being greater than the intake and exhaust of said motor for a given speed of said transmission, means forming a fluid passage interconnecting said passageways, and means to control the pressure of fluid in said passage.

13. A torque converter comprising an input shaft, a sun gear on said shaft, a driven shaft, means supporting a planetary gear on said driven shaft for rotation about said sun gear and in mesh therewith, a ring gear surrounding said sun and planetary gears and meshing with said planetary gear, wall means on said supporting means closely engaging the outer end edges of the teeth of a sector of said ring gear and forming a retaining wall of a pump comprised of said planetary and ring gears, wall means on said supporting means closely engaging the outer ends of the teeth of a sector of said sun gear and cooperating with the teeth of said sun gear to form a fluid motor, means forming relatively unrestricted fluid passageways between ends of said wall means, one of said passageways comprising the outlet and intake of said fluid pump and said fluid motor respectively and the other passageway comprising the exhaust of said motor and the intake of said pump, the outlet and intake capacity of said pump being greater than the intake and exhaust of said motor for a given speed of said transmission, means forming a fluid passage interconnecting said passageways, and means to control the pressure of fluid in said passage comprising valve means in said passage.

14. In a torque converter comprising an input shaft, a sun gear on said shaft, a driven shaft, means supporting a planetary gear on said driven shaft for rotation about said sun gear and in mesh therewith, a ring gear surrounding said sun and planetary gears and meshing with said planetary gear; wall means on said supporting means closely engaging the outer end edges of the teeth of a sector of said ring gear and forming a retaining wall of a pump comprised of said ring gear, wall means on said supporting means closely engaging the outer ends of the teeth of a sector of said sun gear and cooperating with the teeth of said sun gear to form a fluid motor, means forming relatively unrestricted fluid passageways between said ring gear and said sun gear intermediate the ends of said sectors thereof respectively, one of said passageways comprising the outlet and intake of said fluid pump and said fluid motor respectively and the other passageway forming the exhaust of said motor and intake of said pump, the transverse cross sectional area of the intake of said motor being appreciably less than the transverse cross sectional area of said outlet of said pump, means forming a fluid passage interconnecting said passageways, and means to control the pressure of fluid in said passage comprising means to regulate the flow of fluid through said passage.

15. In a torque converter comprising a sun gear, planet gear means supported for revolving about said sun gear, and a ring gear surrounding said sun gear and planet gear means and meshing with said planet gear means; means forming a fluid pump comprised of the meshing portions of said planet gear means and said ring gear and including wall means closely engaging the end edges of the teeth of said ring gear, wall means forming a relatively unrestricted fluid passageway between the area in which said ring gear and said planetary gear means mesh and the area in which said sun gear and said planetary gear means become disengaged, wall means closely engaging the outer edges of the teeth of said sun gear to form a fluid motor therewith having its intake communicating with said passageway, the height of the teeth of said sun gear being appreciably less than the height of the teeth of said planetary gear means whereby the volume of fluid displaced into said passageway by the meshing of the teeth of said ring gear and said planetary gear means is in excess of the volume of fluid removed from said passageway by said teeth of said sun gear, and means for controlling the flow of said excess fluid from said passageway.

16. In a torque converter comprising a sun gear, planet gear means supported for revolving about said sun gear, and a ring gear surrounding said sun gear and planet gear means and meshing with said planet gear means; means forming a fluid pump comprised of the meshing portions of said planet gear means and said ring gear and including wall means closely engaging the end edges of the teeth of said ring gear, wall means forming a fluid passageway between the area in which said ring gear and said planetary gear means mesh and the area in which said sun gear and said planetary gear means become disengaged, wall means closely engaging the outer edges of the teeth of said sun gear to form a fluid motor therewith having its intake communicating said passageway, the height of the teeth of said sun gear being appreciably less than the height of the teeth of said planetary gear means whereby the volume of fluid displaced into said passageway by the meshing of the teeth of said ring gear and said planetary gear means is in excess of the volume of fluid removed from said passageway by said teeth of said sun gear, and means for controlling the flow of said excess fluid from said passageway.

17. A torque converter comprising two planetary type gear units and a common drive member therefor, said units being disposed adjacent one another, each of said units including two side walls and gears journaled between said side walls on axes extending normal to said side walls, said side walls and gears having axial relative movement, and said gears and side walls cooperating to form fluid displacing means, one side wall of one of said units being adjacent one side wall of the other unit, means to control the pressure of fluid to the intake of said motor means for conducting fluid from the outlet of said pump to the inlet of said motor, and means for controlling the fluid pressure in said passageway.

18. The method of loading a reacting gear of a variable speed transmission comprising providing a hydraulic fluid motor in driving connection with a torque transmitting element of the transmission, driving a hydraulic pump means by said reacting gear, said pump means having an output capacity in excess of the intake capacity of said motor for a given speed of the transmission elements, directing the output of said pump means into the intake of said motor, and diverting more or less of the fluid discharged by the pump means in excess of the fluid absorbed by said motor from the intake of said motor to thereby control back pressure of said pump means.

19. In a transmission mechanism in which a fluid circulates:
   (a) first gear means,
   (b) second gear means which meshes with and drives said first gear means, said first and second gear means cooperating to form a pump for said liquid in response to the meshing of their respective teeth,
   (c) means including third gear means forming an effective fluid motor, said third gear means being adapted to be driven and meshing with said second gear means,
   (d) a passageway to conduct said fluid from said pump to said effective motor, and
   (e) means external to said passageway for establishing a predetermined substantially uniform pressure of said fluid therein, said fluid pressure being exerted against said third gear in a direction assisting the latter to turn in its driven direction.

20. In the transmission mechanism according to claim 19 wherein said passageway has fixed dimensions.

21. In the transmission mechanism according to claim 19 wherein said (e) means comprises adjustable means for adjusting said substantially uniform pressure of said fluid in said passageway by allowing predetermined amounts of said fluid to be drawn therefrom.

22. In the transmission mechanism according to claim 19 wherein the preponderance of the fluid output of said pump is applied to exert pressure in said passageway against said third gear means.

23. In the transmission mechanism according to claim 21 wherein said adjustable means comprises another passageway which has adjustable dimensions and communicates with said passageway (d).

24. In a transmission mechanism in which a fluid circulates:
   (a) means including first and second gears for pumping said fluid at a predetermined volumetric output rate,
   (b) means including a third gear which forms an effective fluid motor whose input capacity is less than said volumetric output of said fluid pump,
   (c) a passageway from the output of said fluid pump to the input of said effective fluid motor which conducts the preponderance of said output of said fluid pump to said fluid motor, and
   (d) means for adjusting the pressure of said fluid in said passageway, said adjusting means operating to produce a fluid pressure which is substantially uniform throughout said passage.

25. In the transmission mechanism according to claim 24 wherein said (d) means operates by withdrawing predetermined amounts of said fluid from said passageway.

26. In the transmission mechanism according to claim 25 wherein said (d) means includes another passageway having a variable effective cross-section, said other passageway communicating with said first-named passageway.

27. In a transmission mechanism according to claim 1 in which said driven member comprises a first gear, said variable speed member comprises a second gear meshing with said first gear to form said fluid pump means, and said drive member comprises a third gear meshing with said first gear to form said motor means.

28. In a transmission mechanism according to claim 6 in which said driven member comprises a first gear, said variable speed member comprises a second gear meshing with said first gear to form said fluid pump means, and said drive member comprises a third gear meshing with said first gear to form said motor means.

29. In a transmission mechanism according to claim 28 in which the height of the teeth of said third gear is materially less than the height of the teeth of said first and second gears.

References Cited

UNITED STATES PATENTS

| | | | |
|---|---|---|---|
| 1,870,824 | 8/1932 | Shepard | 60—53 |
| 2,311,237 | 2/1943 | Loveday | 192—61 |
| 2,371,227 | 3/1945 | Dodge | 192—61 |
| 2,406,612 | 8/1946 | Landrum | 192—61 |

EDGAR W. GEOGHEGAN, *Primary Examiner.*